No. 750,113. Patented January 19, 1904.

UNITED STATES PATENT OFFICE.

ARTHUR LÜTTRINGHAUS, OF LUDWIGSHAFEN-ON-THE-RHINE, GERMANY, ASSIGNOR TO BADISCHE ANILIN AND SODA FABRIK, OF LUDWIGSHAFEN-ON-THE-RHINE, GERMANY, A CORPORATION OF GERMANY.

GREEN DYE.

SPECIFICATION forming part of Letters Patent No. 750,113, dated January 19, 1904.

Application filed May 27, 1902. Serial No. 109,225. (No specimens.)

*To all whom it may concern:*

Be it known that I, ARTHUR LÜTTRINGHAUS, doctor of philosophy and a chemist, subject of the King of Prussia, Emperor of Germany, residing at Ludwigshafen-on-the-Rhine, in the Kingdom of Bavaria, Germany, have invented new and useful Improvements in Green Dyes, of which the following is a specification.

This invention relates to a new coloring-matter which dyes unmordanted cotton green, which green on suitable treatment with bichromate of potash and sulfuric acid is changed to blue.

In the following, examples are given according to which this new coloring-matter may be obtained; but the invention is not limited to the proportions or other conditions therein mentioned. The parts are by weight.

Example 1: Dissolve two hundred and forty (240) parts of sodium tetra-sulfid, which should be dehydrated as far as possible, in seven hundred and sixty (760) parts of ethyl alcohol. To this solution add one hundred and twenty (120) parts of carbon disulfid and shake the whole. To this so-obtained mixture add eighty (80) parts of methylene-violet. Now heat this mixture under a return-condenser in a boiling-water bath for several—say three (3)—hours. Then distil off the carbon disulfid remaining in the mixture and resume the heating as before, testing the mixture at intervals of about one (1) hour, as follows: Pour a test portion of the mixture upon bibulous paper and expose the same to the action of the air for ten (10) minutes. Continue this heating and testing until a test yields a permanent green color upon the bibulous paper. Distil off the alcohol, add to the residue three thousand (3,000) parts of water, filter while hot, cool the filtrate, and blow air through the same until precipitation is completed. The precipitate so obtained contains the above-mentioned new coloring-matter and may be employed for dyeing.

Example 2: Introduce forty (40) parts of the blue coloring-matter of United States Letters Patent (Reissue) No. 11,973 (original No. 679,199, dated July 23, 1901) into a hot solution of one hundred (100) parts of sodium tetra-sulfid, which should be dehydrated as far as possible, in six hundred (600) parts of ethyl-alcohol. When solution is completed, add fifty (50) parts of carbon disulfid and heat the whole under a return-condenser on a boiling-water bath for several—say three (3)—hours. Distil off the carbon disulfid remaining in the mixture, resume the heating, and continue the same until a test portion of the mixture poured upon bibulous paper after exposure to the air for ten (10) minutes yields a permanent green color upon the bibulous paper. Now suitably distil off the alcohol, treat the mixture with two thousand (2,000) parts of hot water, filter, and blow air through the cooled filtrate until precipitation is completed.

Example 3: Introduce eighty (80) parts of methylene-violet into a solution of two hundred and forty (240) parts of sodium tetra-sulfid, which should be dehydrated as far as possible, in eleven hundred (1,100) parts of ethyl-alcohol and heat the whole under a return-condenser on a boiling-water bath and test the same at intervals of about one (1) hour, as follows: Dilute a test portion of the mixture with ten (10) parts of water, blow air through this liquid, and shake it out with ten (10) parts of chloroform. Continue this heating and testing until the intensity of the coloration no longer appreciably decreases. Now add to this mixture one hundred and twenty (120) parts of carbon disulfid and heat the whole under a return-condenser on a boiling-water bath for several—say three (3)—hours. Distil off the carbon disulfid remaining in the mixture, resume the heating, and continue the same until a test portion of the mixture poured upon bibulous paper after exposure to the air for about ten (10) minutes yields a permanent green color upon the bibulous paper. Now suitably distil off the alcohol, treat the residue with three thousand (3,000) parts of hot water, filter, and blow air through the cooled filtrate until precipitation is completed.

The products obtained according to these examples are all quite insoluble in cold water, cold ethyl-alcohol, and in a cold-water solution of sodium carbonate. With hot anilin they all give a greenish color, and with cold concentrated sulfuric acid a green color.

If in the place of the methylene-violet of Examples 1 and 3 there be employed the corresponding substances obtainable from diethyl-anilin, the products so resulting also all possess all the above-named properties.

The distinguishing and characteristic property of the products of all the above examples is that when they are dissolved in a water solution of sodium sulfid they dye unmordanted cotton green, and this green is changed to blue when suitably treated with sulfuric acid and bichromate of potash. This change can be produced as follows: Introduce ten (10) parts of the green-dyed material into three hundred (300) parts of bath. This bath is to contain four (4) per cent. (calculated on the green-dyed material to be operated upon) each of sulfuric acid and of bichromate of potash. Work the material for one-half ($\frac{1}{2}$) hour at fifty (50) degrees centigrade and then wash well with water.

What is claimed is—

As a new article of manufacture coloring-matter containing sulfur, such as can be obtained from methylene-violet, sodium tetrasulfid, carbon disulfid and alcohol, which dissolves in a water solution of sodium sulfid, which solution dyes unmordanted cotton green, which green on suitable treatment with sulfuric acid and bichromate of potash is changed to blue.

In testimony whereof I have hereunto set my hand in the presence of two subscribing witnesses.

ARTHUR LÜTTRINGHAUS.

Witnesses:
ERNEST F. EHRHARDT,
JACOB ADRIAN.